US007184985B2

(12) United States Patent
DeTreville

(10) Patent No.: US 7,184,985 B2
(45) Date of Patent: Feb. 27, 2007

(54) METHOD, SYSTEM, AND APPARATUS FOR PROVIDING SECURE ACCESS TO A DIGITAL WORK

(75) Inventor: John D. DeTreville, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 784 days.

(21) Appl. No.: 10/161,139

(22) Filed: May 30, 2002

(65) Prior Publication Data

US 2003/0225697 A1 Dec. 4, 2003

(51) Int. Cl.
*G06Q 99/00* (2006.01)
*H04K 1/00* (2006.01)
*H04L 9/00* (2006.01)

(52) U.S. Cl. ............................ 705/51; 705/50; 705/52; 705/53; 705/54; 705/55; 705/56; 705/57; 705/58; 705/59; 380/201; 707/9; 707/104.1; 713/182; 713/183; 713/184; 713/185; 713/186

(58) Field of Classification Search .................... 705/1, 705/39, 44, 50–59; 713/157, 176, 182–186; 380/201; 707/9, 104
See application file for complete search history.

(56) References Cited

U.S. PATENT DOCUMENTS 4,868,877 A * 9/1989 Fischer ........................ 713/157
5,005,200 A * 4/1991 Fischer ........................ 713/157
5,138,712 A * 8/1992 Corbin ........................ 726/30
5,295,266 A * 3/1994 Hinsley et al. ............. 718/101
5,335,346 A * 8/1994 Fabbio ........................ 711/163
5,337,360 A * 8/1994 Fischer ........................ 713/176
5,629,980 A 5/1997 Stefik et al. ................... 380/4
5,634,012 A 5/1997 Stefik et al. ................ 395/239
5,638,443 A 6/1997 Stefik et al. ................... 380/4
5,715,403 A 2/1998 Stefik ......................... 395/244
6,233,684 B1 5/2001 Stefik et al. ................ 713/176
6,236,971 B1 5/2001 Stefik et al. ................... 705/1

FOREIGN PATENT DOCUMENTS

JP H03-282733 * 3/1990

OTHER PUBLICATIONS

Weber, Robert. Digital Rights Management Technologies. Oct. 1995. Retrieved from IDS.*
"eXtensible rights Markup Language (XrML) 2.0 Specification, Parts I-V: Primer," CONTENTGUARD, Nov. 20, 2001, in http://www.xrml.org.

(Continued)

*Primary Examiner*—James A Reagan
(74) *Attorney, Agent, or Firm*—Merchant & Gould

(57) ABSTRACT

A method, system, and apparatus are provided for securely accessing a digital work, such as digital movie, music file, photo, or other type of digital media. Provider contexts, requester contexts, and exporting contexts exchange logic statements as defined by a distributed logic-based programming language. Logic statements may define trust, delegation, and other security relationships. Decisions regarding access to a digital work are made by a provider context based upon locally stored logic statements and other logic statements imported from other contexts. If the logic statements satisfy a security policy, also defined in terms of logic statements, access is granted to the digital work. Otherwise, access to the digital work is denied.

12 Claims, 8 Drawing Sheets

OTHER PUBLICATIONS

R. Rivest and B. Lampson, "SDSI—A Simple Distributed Security Infrastructure," Oct. 1996.

"ITU-T Recommendation X.509 | ISO/IEC 9594-8: Information Technology—Open Systems Interconnection—The Directory: Public Key and Attribute Certificate Frameworks," International Telecommunication Union, pp. 1-162.

J. Ayars, "XMCL—the eXtensible Media Commerce Language", RealNetworks, Inc., Jun. 2001. In http://www.xmcl.org.

P. Gutmann, "X.509 Style Guide," Oct. 2000. In http://www.cs.auckland.ac.nz.

"ITU-T, X.680, Series X: Data Networks and Open System Communications, OSI Networking and System Aspects—Abstract Syntax Notation One (ASN.1)", Dec. 1997.

C. Ellison, B. Frantz, B. Lampson, R. Rivest, B. Tomas and T. Ylonen, "SPKI Certificate Theory," The Internet Society, 1999, IETF Network Working Group RFC 1693.

N. Li, G. Grosof and J. Feigenbaum, "A Logic-Based Knowledge Representation for Authorization With Delegation (Extended Abstract)," 12th IEEE Computer Security Foundations Workshop, Jul. 1999, pp. 162-174.

B. Lampson, M. Abadi, M. Burrows, and E. Wobber. "Authentication in Distributed Systems: Theory and Practice," vol. 10, No. 4, *ACM Transactions on Computer System*, Nov. 1992, pp. 265-310.

X. Orri and J.M. Mas, "SPKI-XML Certificate Structure," Nov. 2001. IETF Internet Draft, pp. 1-85.

"Open Digital Rights Language (ODRL)," R. Iannella, Editor. In http://ordl.net, pp. 1-56.

D. McDermott and J. Doyle, "Non-Monotonic Logic I," *Artificial Intelligence*, vol. 13, No. 1, Apr. 1980, pp. 41-72.

R. Milner, *Communicating and Mobile Systems: theπ-Calculus*, Cambridge University Press, 1999.

W. F. Clocksin and C.S. Mellish, *Programming In Prolog*, 3rd Edition, Springer-Verlag Berlin Heidelberg, 1987.

A. W. Appel and E. W. Felton, "Proof-Carrying Authentication," Secure Internet Programming Laboratory, Department of Computer Science, Princeton University, 1999, pp. 52-62.

T. Jim, "SD3: A Trust Management System with Certified Evaluation," Proceedings 2001 IEEE Symposium on Security and Privacy, Oakland, CA, IEEE Computer Society, May 2000, pp. 10-115.

M. Blaze, J. Feigenbaum and J. Lacy, "Decentralized Trust Management," Proceedings 1996 IEEE Symposium on Security and Privacy, Oakland, CA, IEEE Computer Society Press, May 1996, pp. 164-173.

J. Biskup, "Achievements of Relational Database Schema Design Theory Revisited," *Semantics in Databases*, Springer-Verlag, 1998, pp. 29-54.

M. Abadi, "On SDSI's Linked Local Name Spaces," *Journal of Computer Security*, vol. 6, IOS Press, 1998, pp. 3-21.

J. Halpern and R. van der Meyden,, "A Logic for SDSI's Linked Local Name Spaces," IEEE Computer Security Foundations Workshop, Mordano, Italy, IEEE Computer Society Technical Committee on Security and Privacy, Jun. 1999, pp. 1111-22.

N. Li, B. Grosof and J. Feigenbaum, "A Practically Implementable and Tractable Delegation Logic," Proceedings 2000 IEEE Symposium on Security and Privacy, Berkely, CA, IEEE Computer Society, May 2000, pp. 27-42.

E. Codd, "A Relational Model of Data for Large Shared Data Banks," *Communications of the ACM*,vol. 13, No. 6, Jun. 1970, pp. 377-387.

J. Gray, M.M. Astrahan, M.W. Blasgen, D.D. Chamberlin, K.P. Eswaran, P.P. Griffiths, W.F. King, R.A. Lorie, P.R. McJones, J.W. Mehl, G.R. Putzolu, I.L. Traiger, B.W. Wade and V. Watson, "System R. ACM Transactions on Database Systems 1, 2," *ACM Transactions on Database Systems*, vol. 1, No. 2, Jun. 1976, pp. 97137.

M. Ajtai and Y. Gurevich, "Data vs. First-Order Logic," *Journal of Computer and System Sciences*, vol. 49, No. 3, Dec. 1994, pp. 562-588.

M. Abadi and R. Needham, "Prudent Engineering Practice for Cryptographic Protocols," IEEE Transactions on Software Engineering, Vo. 22, No. 1, Jan. 1996, pp. 6-15.

* cited by examiner

METHOD, SYSTEM, AND APPARATUS FOR PROVIDING SECURE ACCESS TO A DIGITAL WORK

TECHNICAL FIELD

The invention generally relates to the field of computer security and, more particularly, to the field of providing secure access to digital works.

BACKGROUND OF THE INVENTION

The advent and explosion of the Internet created a world-wide distributed computing network through which virtually any kind of data may be easily transmitted. For years, bandwidth constraints limited the size of data files that could be transmitted over the Internet within a reasonable period of time. As a result, the Internet was typically not utilized as a transmission medium for the distribution of digital works such as music files, movie files, and high resolution photos. However, as broadband Internet connections like digital subscriber lines and cable modems have become more pervasive, the demand and opportunity for digital works on the Internet have greatly increased. As the demand and opportunity for digital works over the Internet have increased, so has the desire of content producers and owners to provide access to digital works in a secure manner.

Systems have been developed to provide secure access to digital works in distributed computing networks. However, these previous systems suffer from one or more drawbacks that make them undesirable for use in many applications. In particular, many of the traditional systems for providing secure access to a digital work only allow a limited range of security relationships to be expressed. For instance, X.509 certificates may be utilized to verify the identity of a requester of a digital work. However, X.509 certificates require a pre-existing bi-lateral relationship between the requester and the provider of the digital work. Moreover, if an X.509 certificate chain is utilized, the certificate chain must be linear and X.509 certificates cannot be accepted from multiple sources. X.509 certificates therefore suffer from a lack of expressiveness and are not useful for providing secure access to a digital work in many situations.

Other systems for providing secure access to digital works also suffer from drawbacks. Once such problem is the lack of scalability. In particular, some previous systems utilize a central clearinghouse for determining whether access should be granted to a requester of a digital work. These systems typically work well for small networks. However, these systems cannot operate on networks the size of the Internet where hundreds of millions of requests may be received simultaneously, and a central clearinghouse will have problems providing adequate availability. Other systems for providing secure access to a digital work also suffer from similar scalability problems.

Therefore, in light of the above problems, there is a need for a method, system, and apparatus for providing secure access to a digital work that can express a wide range of security relationships. There is a further need for a method, system, and apparatus for providing secure access to a digital work that can scale to the size of the Internet and beyond.

SUMMARY OF THE INVENTION

Embodiments of the present invention solve the above-described problems by providing a method, system, apparatus, and computer-readable medium for providing secure access to a digital work that easily permits the expression of a wide range of security relationships. Moreover, embodiments of the present invention solve the above-described problems by providing a method, system, apparatus, and computer-readable medium for providing secure access to a digital work that easily scale to the size of the Internet and beyond.

Generally described, embodiments of the present invention provide a method, system, and apparatus for providing secure access to a digital work, such as a digital movie, music file, photo, or other type of digital media. According to one embodiment of the invention, a system is provided that includes a provider context operative to receive and respond to requests for a digital work. The provider context may include a server computer connected to a distributed computing network, such as the Internet.

In order to determine whether access should be granted to the digital work, the provider context maintains one or more logic statements that together define a security policy for accessing the digital work. The logic statements may be either a language construct for defining a fact pertaining to an arbitrary security relationship or a language construct for defining a rule pertaining to an arbitrary security relationship. The provider context may import additional logic statements from other contexts and derive new logic statements from the imported logic statements and other logic statements maintained by the provider context. The provider context determines whether to allow access to the digital work by evaluating the security policy in view of the locally stored logic statements.

The system provided according to one embodiment of the invention may also include a requester context. The requester context transmits requests to the provider context for access to the digital work. The requester context may also export logic statements to the provider context to support the request. Additionally, the requester context may import logic statements from other contexts and derive additional logic statements from the imported logic statements and logic statements maintained by the requester context. The system provided herein may also include exporting contexts for exporting logic statements to the provider context and the requester context. Statements may be exported from any context as a digital certificate signed by the exporting context and containing the logic statements. Other methods may also be utilized to securely exchange logic statements. The requester context and the exporting contexts may include computer systems connected to a distributed computing network, such as the Internet.

According to various embodiments of the present invention, the requester context may also request the security policy from the provider context. In response, the provider context will provide the security policy to the requester context so that the requester policy can determine how to satisfy the policy. In this regard, the requester policy may construct a proof that the security policy is satisfied and submit the proof to the provider context along with the request to access the digital work. The requester context may then check the proof to determine whether the security policy is satisfied. Alternatively, in another embodiment of the invention, the proof may be constructed by the provider context.

According to another embodiment of the present invention, a method is provided that permits secure access to a digital work. According to one embodiment, the method includes storing one or more logic statements that define a security policy at a provider context. Additional logic statements may be received from a requester context that is requesting access to the digital work. The logic statements received from the requester context may be merged with other logic statements stored at the provider context and additional logic statements may be derived. When a request is received at the provider context for the digital work from the requester context, the provider context evaluates the security policy with the merged group of logic statements to determine whether access to the digital work may be granted.

According to various embodiments of the present invention, the security policy may include logic statements indicating that the requester context is a trusted context. If the requester context is a trusted context, logic statements may be imported at the provider context from the requester context even if the logic statements were received at the requester context from another context, such as an exporting context, and as if they had been stored locally at the provider context, or at another trusted context, or they may be transformed as necessary during import. The methods provided herein may also include importing logic statements at the provider context from one or more exporting contexts. Logic statements may be exported from any context as digital certificates signed by the exporting context and containing the exported logic statements.

Methods provided according to other embodiments of the present invention may also include receiving a request at the provider context for the security policy. In response, the provider context may provide the security policy. The security policy may then be used by the requester context to create a request for the digital work that satisfies the security policy. The request may also include a proof prepared by the requester context proving that the security policy is satisfied by the logic statements stored locally at the provider context. Alternatively, the provider context may prepare the proof.

According to yet another embodiment of the present invention, an apparatus is provided for ensuring that a digital work is accessed only in a secure manner. According to this embodiment, the apparatus comprises a server computer that stores one or more logic statements that define a security policy for accessing the digital work. The server computer may import other logic statements from a client computer or from other external computer systems. The server computer also receives requests from the client computer for access to the digital work, evaluates the security policy with the stored logic statements to determine whether access should be granted, and allows the client computer to access the digital work if the security policy is satisfied.

According to other embodiments, the server computer may provide the security policy to the client computer. The server computer may also receive from the client computer a proof that the security policy is satisfied along with the request to access the digital work. The server computer may then determine whether the proof is valid in order to determine whether the client computer should be provided access to the digital work. Alternatively, the server computer may generate the proof that the security policy is satisfied in response to receiving the request to access the digital work from the client computer. Logic statements may also be exchanged between the client computer, the server computer, and other external computer systems through signed digital certificates.

Other embodiments of the present invention include a computer-readable medium containing computer-readable instructions for providing secure access to a digital work. Additional details regarding the various embodiments of the present invention will be described more completely in the Detailed Description that follows.

DETAILED DESCRIPTION AN ILLUSTRATIVE EMBODIMENT

Figure 1:
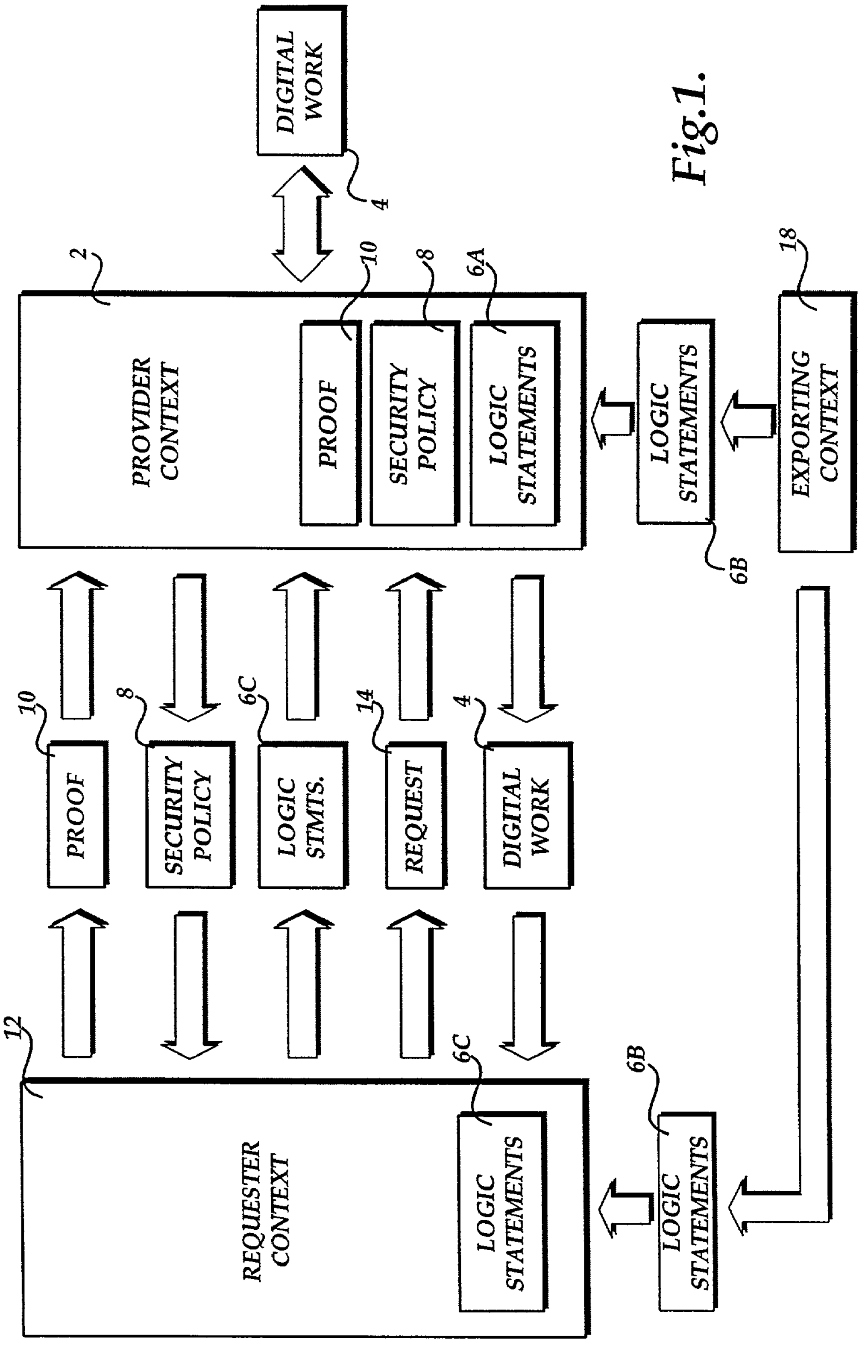
FIG. 1 is a block diagram showing an illustrative system architecture utilized in an actual embodiment of the present invention.

As described briefly above, embodiments of the present invention provide a method, system, apparatus, and computer-readable medium for providing secure access to a digital work. In the following detailed description, references are made to the accompanying drawings that form a part hereof, and in which are shown by way of illustration specific embodiments or examples. These embodiments may be combined, other embodiments may be utilized, and structural changes may be made without departing from the spirit and scope of the present invention. The following detailed description is, therefore, not be taken in a limiting sense, and the scope of the present invention is defined by the appended claims and their equivalents.

Referring now to the drawings, in which like numerals represent like elements through the several figures, aspects of the present invention and the illustrative operating environment will be described. While the invention will be described in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative system architecture utilized by various embodiments of the present invention will be described. As shown in FIG. 1, embodiments of the present invention include a provider context 2, a requester context 12, and one or more exporting contexts 18. A context is a distinct and identifiable computer system. According to the various embodiments of the invention provided herein, a context generally comprises a computer connected to a distributed computing network. However, it should be appreciated that a context may comprise two or more interrelated and interconnected computer systems, a single computer within a larger group of connected computer systems, or one or more computers connected to a computing network in other types of configurations known to those skilled in the art. It may also consist of a suitably isolated portion of one computer system or several computer systems connected to a computer network. Additional details regarding the provider context 2, the requester context 12, and the exporting context 18 are provided below.

The provider context 2, also referred to herein as a service provider or a service, generally comprises a computer system that receives and responds to requests for a digital work 4, such as a digitized movie file, a digitized sound file, a digital photograph, or other type of digital media. The provider context 2 may provide facilities for storing the digital work 4 locally, or may utilize an external storage facility for storage and retrieval of the digital work 4. Moreover, the provider context 2 may receive requests from another context, such as the requester context 12, to download the digital work 4, to stream the digital work 4, to view a portion of the digital work 4, or to otherwise gain access to the digital work 4. The provider context 2 provides facilities for authorizing access to the digital work 4 only to appropriate requesting contexts, such as those requesting contexts that can present to the provider context 2 the proper credentials.

In order to provide access to the digital work 4 in a secure manner, the provider context 2 maintains a security policy 8. The security policy 8 defines the conditions under which access should be granted by the provider context 2 to a requester of the digital work 4. As will be described in greater detail below, the security policy 8 may also define the conditions under which logic statements 6A will be received and imported from other contexts, like the requester context 12 or the exporting context 18. The logic statements 6A define the rules and facts that the provider context 2 utilizes to determine if a particular request the access digital work 4 should be granted. By utilizing the logic statements 6A to define rules, the logic statements 6A are also utilized to define the security policy 8.

According to one embodiment of the invention, the logic statements 6A are defined using an extension of the Datalog logic-programming language, which is a restricted subset of the well-known Prolog logic-programming language. For instance, according to one embodiment, the logic statements 6A may comprise one or more language constructs for defining facts pertaining to a security relationship. For instance, if a user named John Smith is authorized to access the digital work 4, a fact may be defined using one or more logic statements 6A that will grant access because the appropriate authorization atom is defined and thus can be derived. Such a fact may be expressed as "can(john_smith, read, digital_work). In this example, we name "John Smith" via a constant term, but other embodiments of this invention allow naming principals, contexts, etc., in terms of public keys, or in terms of a chain of local names rooted at a public key.

As known to those skilled in the art, an atom combines a predicate and one or more terms. In the example described above, the word "can" is a predicate and "john_smith," "read," and "digital_work" are constant terms. As another example, a simple access control list ("ACL") for the digital work may be represented using the logic-programming language provided herein as shown below in Table 1. Statements having a similar form as those shown in Table 1, with a single atom—a single predicate applied to zero or more terms—are called facts. Since the authorization atom is part of the program shown in Table 1, it is trivially derivable and access may be granted.

TABLE 1

```
can (john_smith, read, digital_work).
can (john_smith, write, digital_work).
can (fred_jones, read, digital_work).
...
```

According to other embodiments of the invention, the logic statements 6A may comprise one or more language constructs for defining rules pertaining to one or more security relationships. For instance, a rule may be defined to state that a principal X, or a context, can read the digital work 4 if the principal X is an employee of a particular company, such as "Big Co." This rule would be expressed as "can(X, read, digital_work):—employee(X, bigco)." As known to those skilled in the art, an atom matching the pattern on the left is derivable if appropriate atom or atoms matching the pattern or patterns on the right are also derivable. Additionally, according to one embodiment of the invention, variables begin with upper-case letters, while constants begin with lower-case letters. This rule would be satisfied if the logic statements 6A also included a fact indicating that a particular individual was a Big Co. employee. For instance, if the rule "employee(john_smith, bigco)" was also stored at the provider context 2, the authorization atom defined by the rule would be derivable with "X=john_smith", and access to the digital work 4 would be granted to "John Smith."

According to various embodiments of the present invention, the logic-programming language provided herein can also express more powerful and more general concepts too. An example of such a program is shown below in Table 2. The first statement in the program shown in Table 2 is a rule stating that principal X can read resource R if X is a Big Co. employee and X's boss (Y) approves. Using new predicates in the manner shown in Table 2, allows the logic-programming language provided herein to define and use new relations as needed to express desired security policies. The following statements indicate that John Smith is an employee of Big Co., that Fred Jones is John Smith's boss, and that Fred Jones approves of John Smith reading resource R. From these facts, the authorization atom "can (X, read, resource_r)" may be derived and John Smith would be provided access to the resource. In order to more fully describe the logic-programming language provided herein, an extended Backus-Naur form grammar of the distributed logic-programming language described herein is shown below in Table 3.

TABLE 2

```
can (X, read, resource_r) :-
    employee (X, bigco),
    boss (Y, X),
    approves (Y, X, read, resource_r).
employee (john_smith, bigco).
boss (fred_jones, john_smith).
approves (fred_jones, john_smith,
        read, resource_r).
...
```

TABLE 3

```
<statement> ::= <clause>
<clause> ::= <head> [ “:-” <body> ] “.”
<head> ::= <atom>
<body> ::= [ <atom> (“,” <atom>)* ]
<atom> ::= [ <context> “says” ]
    <pred> [ “(” <args> “)” ]
<pred> ::= <constant>
<args> ::= <term> (“,” <term>)*
<term> ::= <constant> | <variable>
<context> ::= <term>
<constant> ::= <lower> <idchar>* | “”’
<strchar>* “”’
<var> ::= <upper> <idchar>* | “_” <char*>
```

It should be appreciated that the logic-programming language provided herein is monotonic. This means that if an atom is derivable, it is still derivable if additional logic statements are added. Monotonicity is appropriate in a distributed computing environment because withholding some statements from a provider context will not cause it to grant greater access rights. Moreover, a proof generated by a requester context 12 with little information available will still check on a provider context 2 with more information.

Although the security language illustrated here is based on Datalog, it will be understood that this invention includes other embodiments using security languages based upon logic that are used to control access to digital works. For example, the language XrML 2.0 provides access to digital works according to rules that operate in terms of variables, rules, trust, delegation, and logical inference, and is thus another embodiment of this invention.

Because our security language is based on Datalog, it is PTIME-COMPLETE in terms of the number of facts in the system. This means that it can express any security policy that can be evaluated in polynomial time. Since security policies that cannot be evaluated in polynomial time are not considered practical, we see that the security language in this embodiment of this invention can express all practical policies for access to digital works.

Security decisions regarding access to the digital work 4 are made by the provider context 2 based on the logic statements 6A stored locally by the provider context 2. However, the provider context 2 need not store all of the logic statements 6A that are relevant to security decisions. Rather, logic statements may be stored at other contexts and exported to the provider context 2. For instance, an exporting context 18 may maintain logic statements 6B and export these statements to the provider context 2 and the requester context 12. If the security policy 8 of the provider context 2 or the requester context 12 permits importing logic statements 6B from the exporting context 18, the logic statements 6B will be imported and utilized by the provider context 2 when making security decisions.

The logic statements 6B may also be imported by the requester context 12 and then exported from the requester context 12 to the provider context 2. As will be described below with respect to FIG. 3C, logic statements are qualified to identify the exporting context when they are imported. As will also be described in greater detail below, logic statements are exchanged between contexts utilizing digital certificates signed by the exporting context in one embodiment. However, other secure mechanisms may be used to provide a secure mechanism for transferring logic statements between contexts. Additional details regarding the possible flow of logic statements between contexts will be described below with respect to FIGS. 6 and 7.

According to various embodiments of the present invention, the requester context 12 may transmit a request 14 to the provider context 2 requesting access to the digital work 4. The requester context 12 may also transmit logic statements 6C to the provider context 2 to support its assertion of rights. If the security policy 8 supports the importation of logic statements 6C from the requester context 12, the logic statements 6C will be merged by the provider context 2 with the logic statements 6A so as to be used in determining whether the access to the digital work 4 should be provided to the requester context 12.

According to one embodiment of the invention, the requester context 12 may be permitted to discover the security policy 8 of the provider context 2. In particular, the requester context 12 may request the security policy 8 from the provider context 2. In return, the provider context 2 may transmit to the requester context 12 a copy of the security policy 8. Because policies consist of ordinary statements such as rules and facts, they can be exported in ordinary certificates and imported into the requesting context just as other statements may be exported and imported The provider context 2 may also provide hints to the requester context 12 that provide instructions on how the requester context 12 may satisfy the security policy 8. The requester context 2 may then use the security policy 8 to determine the logic statements 6C necessary to satisfy the security policy 8 and gain access to the digital work 4.

According to another embodiment of the present invention, the requester context 12 may generate a proof 10 that an authorization atom may be derived from the logic statements 6A stored at the provider context 2 indicating that the requester context 12 satisfies the security policy 10. The requester context 12 may then transmit the proof 10 to the provider context 2. The provider context 2 then only needs to check the proof 10 to determine whether access to the digital work 4 should be provided to the requester context 12. Alternatively, the provider context 2 may generate the proof 10.

Figure 2:
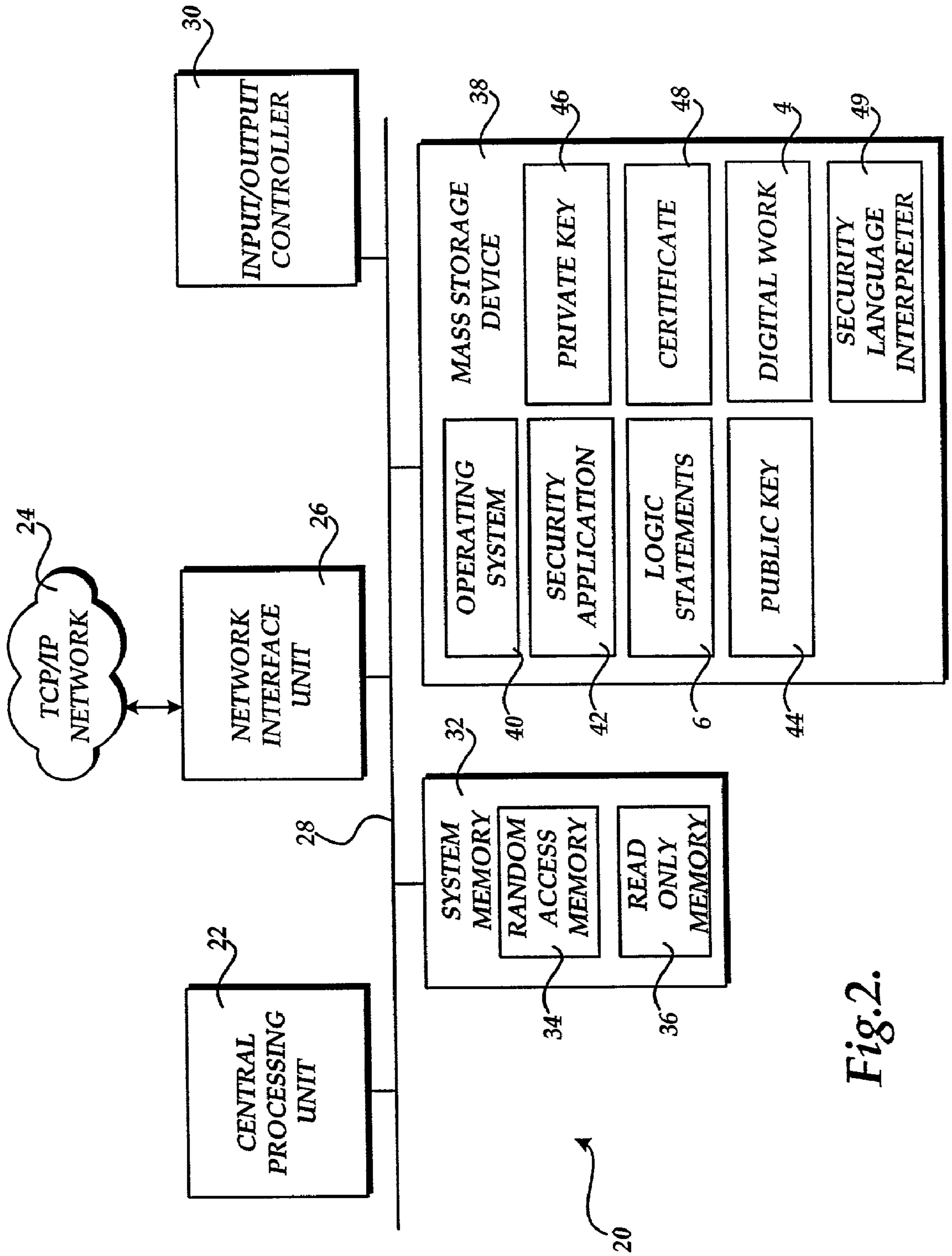
FIG. 2 is a block diagram showing an illustrative computer architecture for a computer utilized in various embodiments of the invention.

Referring now to FIG. 2, an illustrative computer architecture for a computer 20 for practicing the various embodiments of the invention will be described. The computer architecture shown in FIG. 2 may be utilized to provide a computer system for performing the functions of a provider context 2, a requester context 12, or an exporting context 18. It should also be appreciated that the functions of the provider context 2, the requester context 12, and the exporting context 18 may be performed by one another. For instance, the provider context 2 may provide secure access to the digital work 4, export logic statements 6A to other contexts, and request access to digital works from other context. Similarly, the requester context 12 may request access to the digital work 4, export logic statements 6C to other contexts and perform other functions. In this manner, any context may perform some or all of the functions of other contexts.

The computer architecture shown in FIG. 2 illustrates a conventional computer, including a central processing unit 22 ("CPU"), a system memory 32, including a random access memory 34 ("RAM") and a read-only memory ("ROM") 36, and a system bus 28 that couples the memory to the CPU 22. A basic input/output system containing the basic routines that help to transfer information between elements within the computer, such as during startup, is stored in the ROM 36. The computer 20 further includes a mass storage device 38 for storing an operating system 40, application programs, such as a security application 42, and data.

The mass storage device 38 is connected to the CPU 22 through a mass storage controller (not shown) connected to the bus 28. The mass storage device 38 and its associated computer-readable media, provide non-volatile storage for the computer 20. Although the description of computer-readable media contained herein refers to a mass storage device, such as a hard disk or CD-ROM drive, it should be appreciated by those skilled in the art that computer-readable media can be any available media that can be accessed by the computer 20.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer 20.

According to various embodiments of the invention, the computer 20 may operate in a networked environment using logical connections to remote computers through a TCP/IP network 24, such as the Internet. In this manner, the computer 20 may establish communications links with other contexts on the TCP/IP network 24 or other type of network. The computer 20 may connect to the TCP/IP network 24 through a network interface unit 26 connected to the bus 28. It should be appreciated that the network interface unit 26 may also be utilized to connect to other types of networks and remote computer systems. The computer 20 may also include an input/output controller 30 for receiving and processing input from a number of devices, including a keyboard or mouse (not shown). Similarly, an input/output controller 30 may provide output to a display screen, a printer, or other type of output device.

As mentioned briefly above, a number of program modules and data files may be stored in the mass storage device 38 and RAM 34 of the computer 20, including an operating system 40 suitable for controlling the operation of a networked client or server computer, such as the WINDOWS XP operating system from MICROSOFT CORPORATION of Redmond, Wash. The mass storage device 38 and RAM 34 may also store one or more application programs. In particular, the mass storage device 38 and RAM 34 may store a security application program 42 for controlling the operation of the computer 20 with respect to security transactions. In particular, the security application program 42 controls the operation of the computer 20 for sending, receiving, and responding to requests for access to the digital work 4, for importing and exporting logic statements 6, for creating, signing, and checking the signatures on digital certificates 48, and performing other functions described herein relative to the operation of a provider context 2, requester context 12, or exporting context 18.

A security language interpreter 49 may also be stored in the mass storage device 38 and utilized by the security application 42. The security language interpreter 49 interprets and evaluates the logic statements 6. The security language interpreter 49 may be utilized by the computer 20 to determine whether authorization atoms may be derived, to prepare proofs, and to determine whether proofs are valid. The mass storage device 38 may also be utilized to store one or more digital works 4 and one or more digital certificates 48. The mass storage device 38 may also store a public key 44 and a private key 46 for use with the digital certificates 48. Additional details regarding the use of the public keys 44, private keys 49, and the digital certificates 48 in the various embodiments of the present invention will be described below with respect to FIGS. 3B and 3C.

Figure 3B:
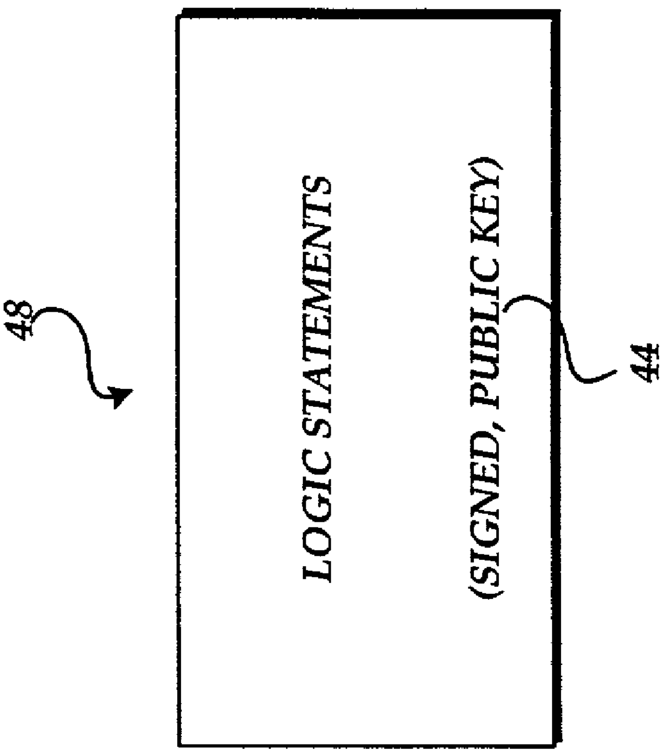
FIG. 3B is a block diagram showing the structure of a certificate utilized in one actual embodiment of the present invention.
Figure 3A:
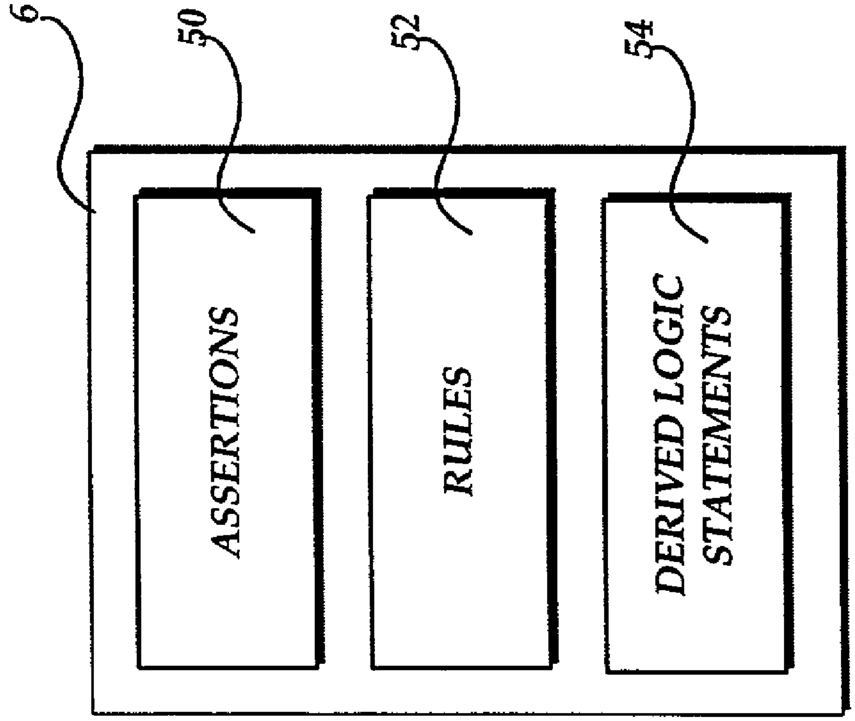
FIG. 3A is a block diagram showing several different types of logic statements utilized in various embodiments of the present invention.

Turning now to FIG. 3A, additional details regarding the logic statements 6 will be described. As shown in FIG. 3A and discussed briefly above, logic statements 6 may comprise assertions 6, also called facts, or rules 52. Additionally, derived logic statements 54, also called derived atoms, may be created by deriving logical statements from the assertions 50 and rules 52 stored at a context. These derived logic statements 54 may then be utilized by the context when making access control decisions. As described above, a provider context 2 grants access to a digital work 4 only when it can derive an atom authorizing the access. Otherwise, by default, the context denies access to the digital work. The process of deriving the derived logic statements 54 forms a proof that access should be granted by the provider context 2.

Referring now to FIG. 3B, additional details regarding the use of digital certificates 48 in the various embodiments of the present invention will be described. As known to those skilled in the art, a digital certificate 48 is a signed data structure that can transmitted and utilized to establish the identity of the sending party. According to various embodiments of the invention, a digital certificate 48 may be utilized to securely export logic statements from one context to another. In particular, in one embodiment, each context has its own cryptographic key pair, which includes a public key 44 and a corresponding private key 46. An exporting context 18 uses the private key 46, which it keeps secret, to sign logic statements. The corresponding public key 44 is used to verify the signature at the importing context and also serves to name the exporting context 18. As will be described in greater detail below with respect to FIG. 3C, the public key 44 is used to qualify imported logic statements when they are imported into the receiving context.

Figure 3C:
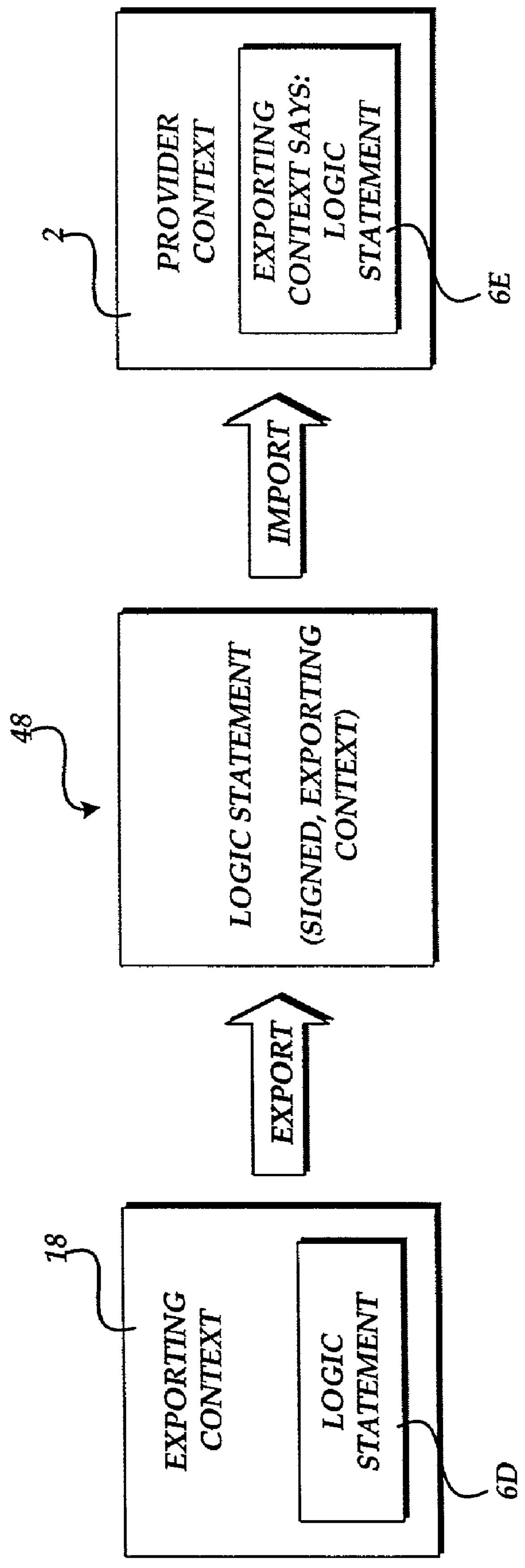
FIG. 3C is a block diagram showing an illustrative data flow for exporting a logic statement from one context and importing the logic statement into another context in one embodiment of the invention.

Turning now to FIG. 3C, various details regarding the process of exporting logic statements 6 from one context to another context will be described. As shown in FIG. 3C, an exporting context may maintain one or more logic statements 6D, such as a fact, rule, or derivable atom. In order to export the logic statements 6D to another context, such as the provider context 2, the exporting context may export the logic statements 6D into a signed certificate 48. The exporting context 18 signs the logic statements 6D with its public key 44. The digital certificate 48 is then transmitted to the importing context, such as the provider context 2, via a distributed computing network.

When the provider context 2 receives the digital certificate 48, the provider context 2 utilizes the exporting context's public key 44 to check the signature on the digital certificate 48 and extract the logic statements 6D. The provider context 2 qualifies imported statements by quoting the sender of the logic statements 6D. In particular, according to one embodiment of the present invention, the importing context quotes the logic statements 6D using the keyword "says" to distinguish the imported logic statements 6E from local assertions. For instance, if the public key 44 of the exporting context is "rsa:3:clebab5d" (real keys are much longer), then the statement "employee(john_smith, bigco) would be imported as "rsa:3:clebab5d says employee (john_smith, bigco)." If the importing context has a rule such as "employee(X, bigco):—rsa:3:clebab5d says employee(X, bigco)", then the atom "employee(john_smith, bigco)" is also derivable at the importing context. In the absence of any such rule, the imported statement will by default be inert and will not take further part in the decision procedure.

As described above, logic statements from any context may be exported and later imported into another context. Since imported logic statements are automatically qualified and quoted with "says," the importing context can treat imported logic statements differently from locally stored logic statements. This controlled importation of signed logic statements allows the distributed logic-programming language provided herein to model "trust" (as in, "Service S trusts BigCo HR"), "delegation" ("Service S delegates the identification of BigCo employees to BigCo HR"), and "speaks-for" ("BigCo HR speaks for service S"). Additional details regarding the process of modeling trust, delegation, and other relationships will be described below with reference to FIGS. 6 and 7.

Figure 4:
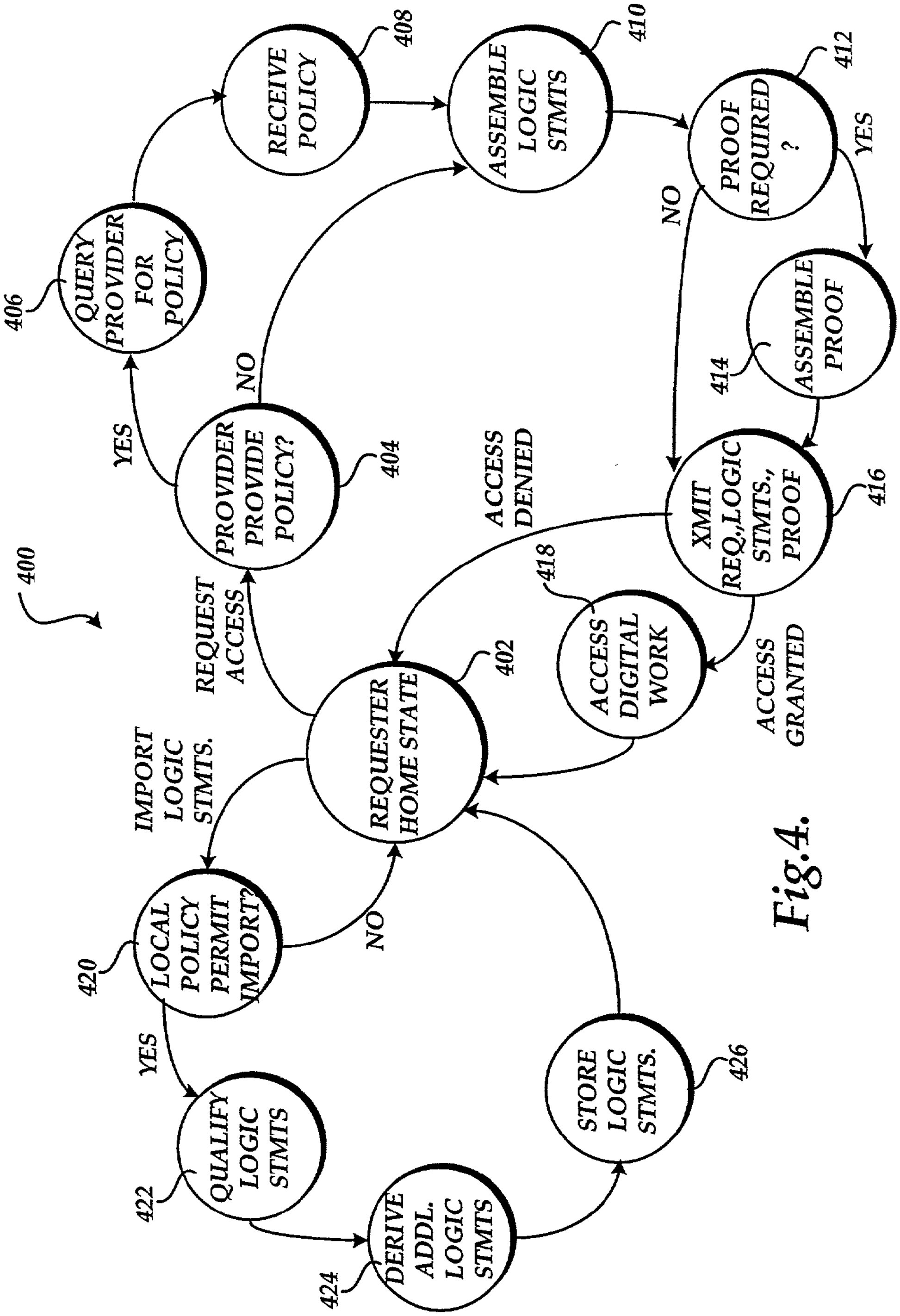
FIG. 4 is a state diagram illustrating the operation of a requester context according to one actual embodiment of the present invention.

Referring now to FIG. 4, a state machine 400 will be described that illustrates the operation of a requester context 12 according to one embodiment of the present invention. The state machine 400 begins at state 402, the requester home state. From the requester home state 402, the state machine 400 periodically transitions to other states depending upon the function being performed. For instance, as described above, the requester context 12 may periodically import logic statements from digital certificates received from exporting contexts. In order to perform the importation of exported logic certificates, the state machine 400 transitions to state 420.

At state 420, a determination is made as to whether the local policy of the requester context 12 permits the importation of logic statements. If the local policy does not permit importation of logic statements, the state machine 400 returns to the requester home state 402. If the local policy of the requester context 12 permits the importation of logic statements from an external context, the state machine 400 transitions from state 420 to state 422. At state 422, the requester context 12 qualifies the imported logic statements by quoting the statements with "says," or another qualifier term, and the identity of the exporting context. The process of qualifying the imported logic statements is described above with respect to FIG. 3C.

From state 422, the state machine 400 continues to state 424, where additional logic statements are derived at the requester context 12 based upon the newly imported logic statements and any other logic statements stored locally at the requester context. The state machine 400 then transitions to state 426, where the imported logic statements and any derived logic statements are stored at the requester context. The state machine 400 then transitions back to the requester home state 402 where it may perform other functions.

The requester context 12 may also periodically make a request of a provider context 2 for access to a digital work 4. In order to perform the request procedure, the state machine 400 transitions to state 404. At state 404, the requester context 12 determines whether the provider context 2 will provide the security policy 8. As discussed above, according to various embodiments of the present invention, the provider context 2 will transmit to the requester context 12 a copy of the security policy 8 for use in creating request that satisfies the policy. If the provider context 2 provides the security policy 8, the state machine 400 transitions to state 406, where the requester context 12 queries the provider context 2 for the policy. The state machine 400 then transitions to state 408 where the policy is received and, subsequently, to state 410. If the provider context 2 does not provide its security policy 8, the state machine 400 transitions directly from state 404 to state 410, where the security policy 8 might be assumed already to be known to be of a certain form.

At state 410, the requester context 410 assembles the logic statements necessary to satisfy the security policy 8. The requester context 12 also signs the logic statements and places them into a digital certificate. The state machine 400 then continues to state 412, where a determination is made by the requester context 12 as to whether the provider context 2 requires a proof that the security policy is satisfied from the requester context 12. As discussed above, the proof may be created by the requester context 12 and transmitted to the provider context 2, where it is checked, or it may be generated by the provider context 2. If the proof is to be constructed at the provider context 2, the state machine 400 transitions from state 412 to state 416. If, however, the proof is to be constructed at the requester context 12, the state machine 400 transitions to state 414 where the proof is assembled. The state machine 400 then transitions from state 414 to state 416.

At state 416, the request to access the digital work 4, the digital certificate containing the logic statements supporting the request, and the proof, if required, are transmitted from the requester context 12 to the provider context 2. Based upon this information, and its locally stored logic statements, the provider context 2 can determine whether access to the digital work 4 should be provided to the requester context 12. If access to the digital work 4 is granted, the state machine 400 transitions to state 418, where the requester context 12 accesses the digital work 4. Once the requester context 12 has completed its access, the state machine 400 returns to the requester context home state 402. If, at state 416, access is not granted to the digital work 4, the state machine 400 transitions from state 416 directly to the requester context home state 402, where it may import additional logic statements or make further requests of the provider context 2 for the digital work 4.

Figure 5:
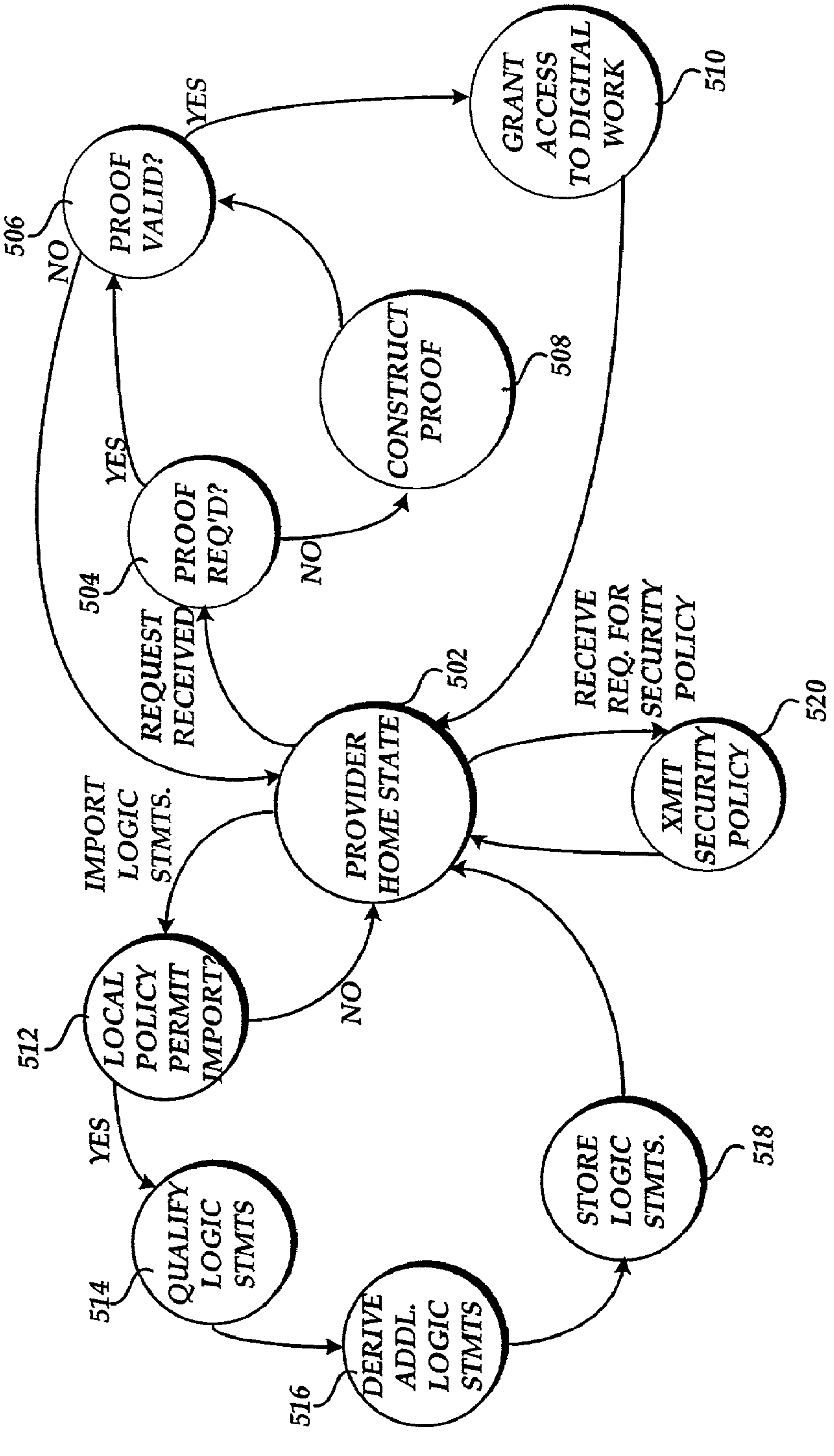
FIG. 5 is a state diagram illustrating the operation of a provider context according to one actual embodiment of the present invention.

Turning now to FIG. 5, a state machine 500 will be described that illustrates the operation of a provider context 2 according to one embodiment of the present invention. The state machine 500 begins at state 502, the provider context home state. From the provider home state 502, the state machine 500 periodically transitions to other states depending upon the function being performed. For instance, as described above, the provider context 2 may periodically import logic statements contained within digital certificates received from exporting contexts. In order to perform the importation of exported logic certificates, the state machine 500 transitions to state 512.

At state 512, a determination is made as to whether the local policy of the provider context 2 permits the importation of logic statements. If the local policy does not permit importation of logic statements, the state machine 500 returns to the provider home state 502. If the local policy of the provider context 2 permits the importation of logic statements from the exporting context, the state machine 500 transitions from state 512 to state 514. At state 514, the provider context 2 qualifies the imported logic statements by quoting the statements with "says," or another qualifier term, and the identity of the exporting context. The process of qualifying the imported logic statements is described above with respect to FIG. 3C.

From state 514, the state machine 500 continues to state 516, where additional logic statements are derived at the provider context 2 based upon the newly imported logic statements and any other logic statements stored locally at the provider context 2. The state machine 500 then transitions to state 518, where the imported logic statements and any derived logic statements are stored at the requester context. The state machine 500 then transitions back to the provider context home state 502 where it may perform other functions.

As described above, in various embodiments of the invention the provider context 2 may provide its security policy 8 to requester context 12. In such an embodiment, the provider context 2 may periodically receive a request from a requester context 12 for the security policy 8. In response to receiving such a request, the state machine 500 transitions to state 520, where the security policy 8 is transmitted from the provider context 2 to the requester context 8. The state machine 500 then transitions from state 520 back to the provider context home state 502.

The state machine 500 also illustrates the fictionally of the provider context 2 for receiving and responding to requests from a requester context 12 for the digital work 4. In particular, when such a request is received, the state machine 500 transitions from state 502 to state 504. At state 504, the provider context 2 determines whether it is configured to require a proof that the security policy 8 is satisfied from the requester context 12. If a proof is not required, the state machine 500 transitions to state 508, where the provider context 2 constructs the proof. The state machine 500 then transitions from state 508 to state 506. If, however, a proof is required from the requester context 12 at state 504, the proof is received from the requester context 12 and the state machine 500 transitions to state 506.

At state 506, the provider context 2 determines whether the proof provided by the requester context 12 or constructed by the provider context 2 is valid. In particular, the provider context determines whether the proof indicates that the security policy 8 is satisfied by the locally stored logic statements 6, including any logic statements imported to the provider context 2 from the requester context 12. If the proof is invalid, access to the digital work 4 is denied and the state machine 500 transitions back to the provider context home state 502. If the proof is valid, the state machine 500 transitions to state 510 where access to the digital work 4 is granted to the requester context. The state machine 500 then transitions back to state 502, where additional requests for access to the digital work 4 may be processed in the manner described above.

Figure 6:
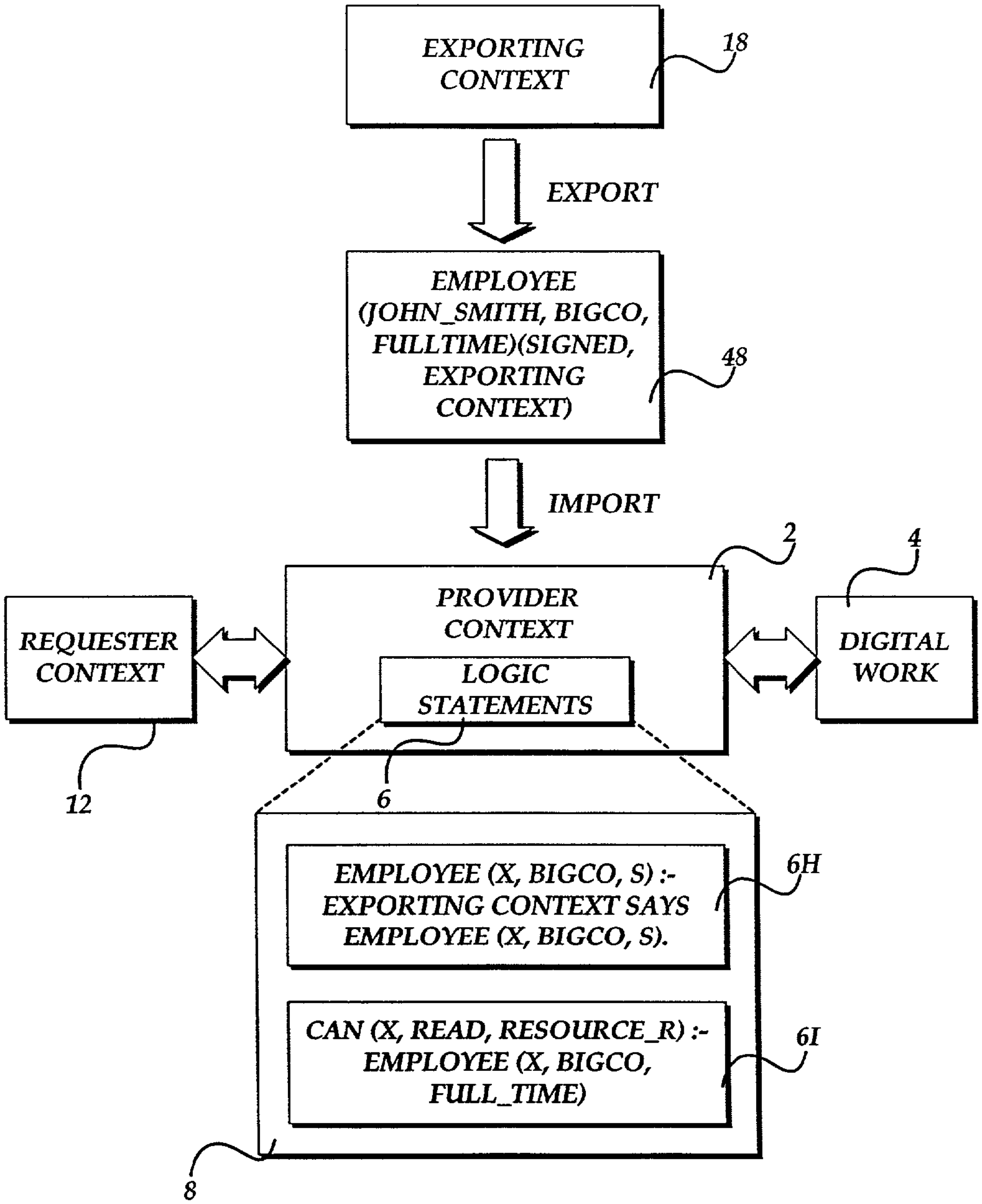
FIGS. 6–7 are block diagrams illustrating the flow of logic statements between contexts according to several embodiments of the present invention.

Referring now to FIG. 6, an illustrative example of the types of authorization schemes that may be created using the present invention will be described. As shown in FIG. 6, the provider context 2 maintains several logic statements 6 that define a security policy 8 for accessing the digital work 4. In particular, the provider context 2 maintains a logic statement 6H that models a trusted relationship with the exporting context 18. To model trust, the logic statement 6H states "employee (X, bigco, S):—Exporting Context says employee (X, bigco, S)." In English, this rule states that the provider context 2 will consider a particular individual an employee of Big Co. if the exporting context 18 says that the employee is employed by Big Co. A complete translation of each of the logic statements illustrated in FIG. 6 is shown below in Table 4.

TABLE 4

| # | English Statement | Logic Statement |
|---|---|---|
| 48 | "John Smith is a full-time BigCo employee" | employee (john_smith, bigco, full_time). (original form, in the context of the exporting context) |
| 48 | | rsa:3:c1ebab5d says employee (john_smith, bigco, full_time). (as imported into the context of the provider context) |
| 6H | "I trust BigCo HR to say who is a BigCo employee" | employee (X, bigco, S) :- rsa:3:c1ebab5d says employee (X, bigco, S). |
| 6I | "Full-time BigCo employees can read resource R" | can (X, read, resource_r) :- employee (X, bigco, full_time). |
| | "John Smith can read resource R" | can (john_smith, read, resource_r). |

The provider context 2 also maintains a logic statement 6I representing a rule stating that full-time Big Co. employees can read the resource "R," such as the digital work 4. This rule is expressed utilizing the distributed logic-programming language provided herein as "can (X, read, resource_r):—employee(X, bigco, full_time)." Additionally, the provider context 2 may import a logic statement contained in a digital certificate 48 from the exporting context 18. In the context of the exporting context 18, the logic statement contained in the digital certificate 18 reads as "employee(John_Smith, bigco, fulltime)", or in English as "John Smith is a full-time Big Co. employee. However, when the statement is imported into the provider context 2, the statement is qualified with the public key of the exporting context. So, as an example, if the name of the exporting context is the public key "rsa:3:8e72145b", the imported statement in the provider context may read as "rsa:3:8e72145b says employee (john_smith, bcl)." The qualified logic statement may then be stored at the provider context 2 with the other logic statements 6.

When the requester context 12 requests access to the digital work 4 from the provider context 2, the provider context 2 uses its local logic statements 6 to determine whether the security policy is satisfied. In the example shown in FIG. 6, the provider context 2 has imported a logic statement indicating that John Smith is a full-time Big Co. employee. Because the security policy of the provider context 2 includes a trusted relationship with the exporting context 18, this logic statement is used to determine whether a request to access the digital work 4 may be granted. Moreover, because the security policy of the provider context 2 includes a logic statement 6I that indicates that full-time Big Co. employees may access the digital work 4, an atom is derivable indicating that John Smith may access the digital work 4. Therefore, the provider context will grant access to the digital work 4 to the requesting context 12 if the requesting context 12 is "John Smith."

Figure 7:
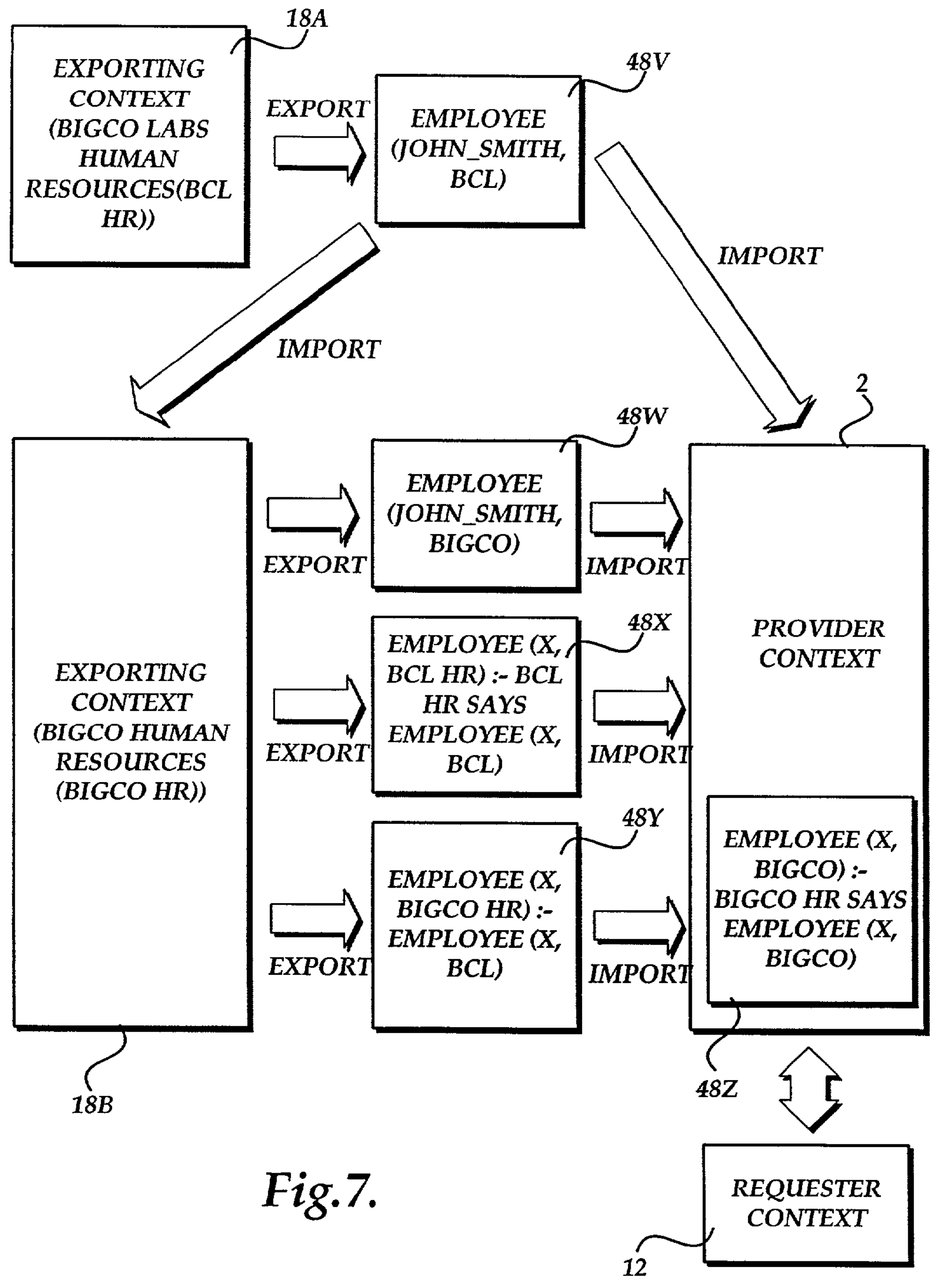

Referring now to FIG. 7, another illustrative example of the types of authorization schemes that may be created by the various embodiments of the present invention will be described. In FIG. 7, an exporting context 18B, called Big Co. Human Resources, has delegated the identification of employees to another exporting context 18A, called Big Co. Labs HR. The delegation of identification is expressed using the logic statement "employee (X, BCL HR):—BCL HR says (X, BCL)." Additionally, the provide context has delegated the identification of Big Co. employees to Big Co. HR (the exporting context 18B. This delegation relationship is expressed by the logic statement "employee (X, bigco):—bigcoHR says employee (X, bigco)." A complete translation of each of the logic statements illustrated in FIG. 7 is shown below in Table 5.

TABLE 5

| # | English Statement | Logic Statement |
|---|---|---|
| 48V | "John Smith is a BCL employee" | employee (john_smith, bcl). (original form, in the context of exporting context 18A) |
| 48V | | rsa:3:8e72145b says employee (john_smith, bcl). (as imported into the context of exporting context 18B or provider) |
| 48X | "I trust BCL HR to say who is a BCL employee" | employee (X, bcl) :- rsa:3:8e72145b says employee (X, bcl). (original form, in the context of exporting context 18B) |
| 48X | | rsa:3:c1ebab5d says employee (X, bcl) :- rsa:3:8e72145b says employee (X, bcl). (as imported into the context of provider) |
| 48Y | "All BCL employees are BigCo employees" | employee (X, bigco) :- employee (X, bcl). (original form, in the context of exporting context 18B) |
| 48Y | | rsa:3:c1ebab5d says employee (X, bigco) :- rsa:3:c1ebab5d says employee (X, bcl). (as imported into the provider context) |
| 48Z | "I trust BigCo HR to say who is a BigCo employee" | employee (X, bigco) :- rsa:3:c1ebab5d says employee (X, bigco). |
| 48W | "John Smith is a BigCo employee" | employee (john_smith, bigco). (in the exporting context 18B) |
| 48W | | rsa:3:c1ebab5d says employee (john_smith, bigco). (in the provider context, after certificate import or local derivation) employee (john_smith, bigco) (in the provider contex, after further local derivation) |

In FIG. 7, the goal is to convince the provider context 2 that John Smith is a BigCo employee and is therefore entitled to access a digital work 4 stored by the provider context 2. The necessary information to accomplish this can flow along multiple distinct paths in different scenarios. In one scenario, BCL HR (the exporting context 18A) exports certificate 48V to BigCo HR (the exporting context 18B), whose local policy allows its import. BigCo HR now concludes that John Smith is a BigCo employee, and exports certificates 48W, 48X, and 48Y to the provider context 2, whose local policy allows their import. The provider context 2 then concludes that John Smith is a BigCo employee and provides access accordingly.

Alternatively, BCL HR (the exporting context 18A) can export certificate 48V directly to the provider context 2, and BigCo HR (the exporting context 18B) can export certificates 48X and 48Y also directly to the provider context 2, which can now conclude, as above but on its own, that John Smith is a BigCo employee. This scenario models a traditional "chain of trust": the provider context 2 trusts BigCo HR (the exporting context 18B) to establish a policy, while BigCo HR (the exporting context 18B) trusts BCL HR (the exporting context 18A). It should be appreciated that the examples described herein are merely illustrative and that other types of security relationships may be modeled and that other paths for certificate exchange between contexts may be utilized.

Based upon the foregoing, it should be appreciated that embodiments of the invention provide a method, system, apparatus, and computer-readable medium for providing secure access to a digital work. The above specification, examples and data provide a complete description of the manufacture and use of the composition of the invention. Since many embodiments of the invention can be made without departing from the spirit and scope of the invention, the invention resides in the claims hereinafter appended.

We claim:

1. system for providing secure access to a digital network, comprising:

a provider computer operative to:

store one or more logic statements defining a security policy for accessing the digital network, each of the one or more logic statements comprising one of the following: a language construct for defining a fact pertaining to an arbitrary security relationship; and a language construct for defining a rule pertaining to an arbitrary security relationship, receive a request from a requester computer for access to the digital network, store one or more logic statements imported from the requester computer, and evaluate the security policy with the stored logic statements to determine whether to grant access to the digital network in response to the request wherein the provider computer is further operative to generate a proof that the security policy is satisfied by the logic statements stored at the provider computer and to determine whether the proof is correct in order to determine whether to grant access to the digital network in response to the request wherein determining whether the proof is correct comprises determining that an authorization atom is derivable from the logic statements stored at the provider computer;

a requester computer operative to:

transmit a request to access the digital network to the provider computer, and export one or more logic statements to the provider computer; and one or more exporting computers, and wherein the provider computer and the requester computer are further operative to import and store loqic statements from the one or more exporting computers, and wherein the requester computer is further operative to export logic statements received from the one or more exporting computers to the provider computer wherein the provider computer is further operative to derive additional logic statements from the logic statements received from the requester computer and the one or more exporting computers wherein the requester computer is further operative to derive additional loqic statements from the loqic statements received from the one or more exporting computers wherein the provider computer is further operative to qualify logic statements received from the requester computer to indicate that the statements were received from the requester computer wherein the provider computer is further operative to qualify logic statements received from the one or more exporting computers to indicate that the statements were received from the one or more exporting computers wherein the requester computer is further operative to qualify logic statements received from the one or more exporting computers to indicate that the statements were received from the one or more exporting computers.

2. The system of claim 1, wherein the requester computer is further operative to request the security policy from the provider computer, and wherein the provider computer is further operative to provide the security policy to the requester computer.

3. The system of claim 2, wherein the logic statements are exported from the requester computer and the one or more exporting computers to the provider computer in digital certificates.

4. The system of claim 3, wherein the provider computer comprises a server computer and wherein the requester computer comprises a client computer, and wherein the client computer and the server computer are connected via a distributed computing network.

5. A method for providing secure access to a digital network, comprising:

storing at a provider computer one or more logic statements that define a security policy for access to the digital network, each of the one or more logic statements comprising one of the following: a language construct for defining a fact pertaining to an arbitrary security relationship; and a language construct for defining a rule pertaining to an arbitrary security relationship;

receiving a request to access the digital network from a requester computer;

importing one or more additional logic statements from the requester computer;

merging the logic statements stored at the provider computer and the additional logic statements received from the provider computer to create a merged set of logic statements;

evaluating the security policy with the merged group of logic statements to determine whether to grant access to the digital network in response to the request wherein the provider computer is further operative to generate a proof that the security policy is satisfied by the logic statements stored at the provider computer and to determine whether the proof is correct in order to determine whether to grant access to the digital network in response to the request wherein determining whether the proof is correct comprises determining that an authorization atom is derivable from the logic statements stored at the provider computer wherein the logic statements stored at the provider computer comprise logic statements received from the requester computer and from one or more exporting computers and wherein logic statements are exported from the requesting computer to the provider computer as digital certificates signed by the requesting computer and contain the exported logic statements; and qualifying the logic statements imported from the requesting computer and the one or more exporting computer so that the logic statements identify the computer from which they were exported.

6. The method of claim 5, wherein the logic statements received from the requester computer comprise logic statements received at the requester computer from the one or more exporting computers.

7. The method of claim 6, wherein the logic statements received from the requester computer comprise logic statements derived at the requester computer based on logic statements received at the requester computer from the one or more exporting computers and logic statements stored at the requester computer.

8. The method of claim 7, wherein the security policy comprises logic statements indicating that the requester computer is trusted, and wherein the provider computer merges the logic statements received at the requester computer from the one or more exporting computers with other logic statements stored at the provider computer as if the logic statements received from the one or more exporting computers were generated by the requesting computer, or following a set of defined transformations.

9. The method of claim 8, wherein logic statements are exported from the one or more exporting computers as digital certificates signed by the exporting computer and containing the exported logic statements.

10. The method of claim 5, further comprising:

receiving a request at the provider computer for the security policy; and providing the security policy in response to the request.

11. An apparatus for providing secure access to a digital network, comprising a server computer operative to:

store one or more logic statements that define a security policy for access to the digital network, each of the one or more logic statements comprising one of the following: a language construct for defining a fact pertaining to an arbitrary security relationship; and a language construct for defining a rule pertaining to an arbitrary security relationship;

import one or more additional logic statements from a client computer ;

receive a request to access the digital network from the client computer;

evaluate the security policy with the logic statements received from the client computer to determine whether to grant access to the digital network wherein the server computer is further operative to generate a proof that the security policy is satisfied by the logic statements stored at the server computer and to determine whether the proof is correct in order to determine whether to grant access to the digital network in response to the request wherein determining whether the proof is correct comprises determining that an authorization atom is derivable from the logic statements stored at the server computer;

in response to determining that access may be granted, allow the client computer to access the digital network;

import logic statements from one or more additional computer systems and to utilize the imported logic statements to evaluate the security policy in response to the access request;

receive a request from the client computer for the security policy and to provide the security policy to the client computer in response to the request; and qualify loqic statements received from the client computer and the one or more additional computer systems with an identification of the computer from which the loqic statements were received.

12. The apparatus of claim 11, wherein the server computer is further operative to derive additional logic statements from the logic statements received from the client computer and the one or more additional computer systems, and to use the derived logic statements to determine whether the security policy is satisfied in response to the request from the client computer to access the digital network.

* * * * *